United States Patent [19]
Roxton et al.

[11] Patent Number: 4,570,677
[45] Date of Patent: Feb. 18, 1986

[54] UNITARY MULTIPLE CONTROL VALVE ASSEMBLY

[75] Inventors: George F. Roxton, Wheeling; Howard Leibovitz, Chicago, both of Ill.

[73] Assignee: Paratech Incorporated, Frankfort, Ill.

[21] Appl. No.: 481,048

[22] Filed: Mar. 31, 1983

[51] Int. Cl.[4] .............................................. F16K 17/04
[52] U.S. Cl. .................................... 137/881; 137/552; 137/557; 137/596.2; 137/883; 251/100
[58] Field of Search ..................... 137/596.2, 881, 883, 137/552, 557, 596; 251/100

[56] References Cited

U.S. PATENT DOCUMENTS

| | | | |
|---|---|---|---|
| 1,731,519 | 10/1929 | Bastian | 137/881 |
| 2,362,671 | 11/1944 | Schwan et al. | 137/596.2 |
| 2,621,050 | 12/1952 | Campbell | 137/596.2 |
| 3,502,106 | 3/1970 | Blanchard et al. | 137/881 |
| 3,559,689 | 2/1971 | Dunbar | 137/596.2 |
| 3,753,447 | 8/1973 | Davis et al. | 137/596 |
| 3,760,842 | 9/1973 | Mikiya | 137/557 |
| 3,915,354 | 10/1975 | Lo | 251/100 |
| 4,073,312 | 2/1978 | Voos et al. | 137/596.2 |
| 4,168,015 | 9/1979 | Robinette | 137/881 |
| 4,280,532 | 7/1981 | Bible et al. | 137/881 |

Primary Examiner—Albert J. Makay
Assistant Examiner—Steven E. Warner
Attorney, Agent, or Firm—Haight, Hofeldt, Davis & Jambor

[57] ABSTRACT

Control valves for a plurality of outlets supplied from a single fluid source are combined in a single manifold. Each outlet conduit is selectively connected to an inlet conduit by an independently actuatable source valve. Each outlet conduit is also provided with an independently actuatable discharge valve and a safety relief valve. A pressure gauge may also be connected to each of the outlet conduits. The conduits may be channels formed in a solid manifold, and the independently actuatable valves may be manually actuatable push button valves. A locking mechanism is provided for each of the push button valves.

5 Claims, 11 Drawing Figures

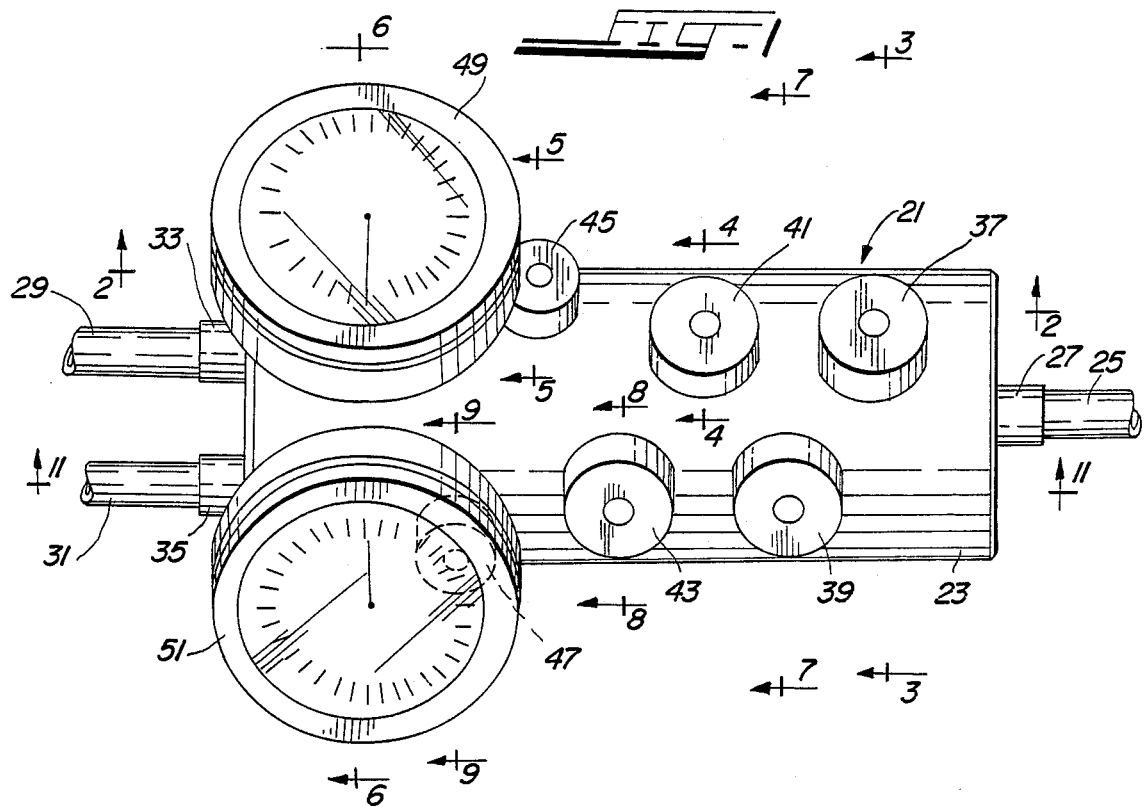
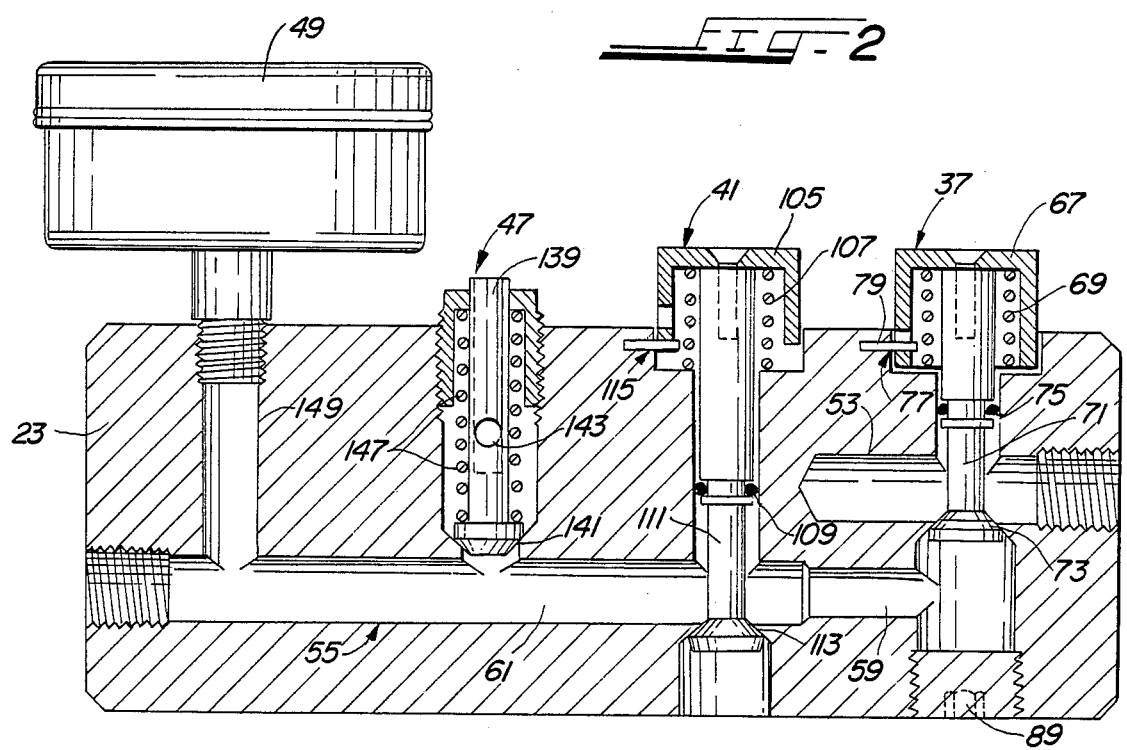

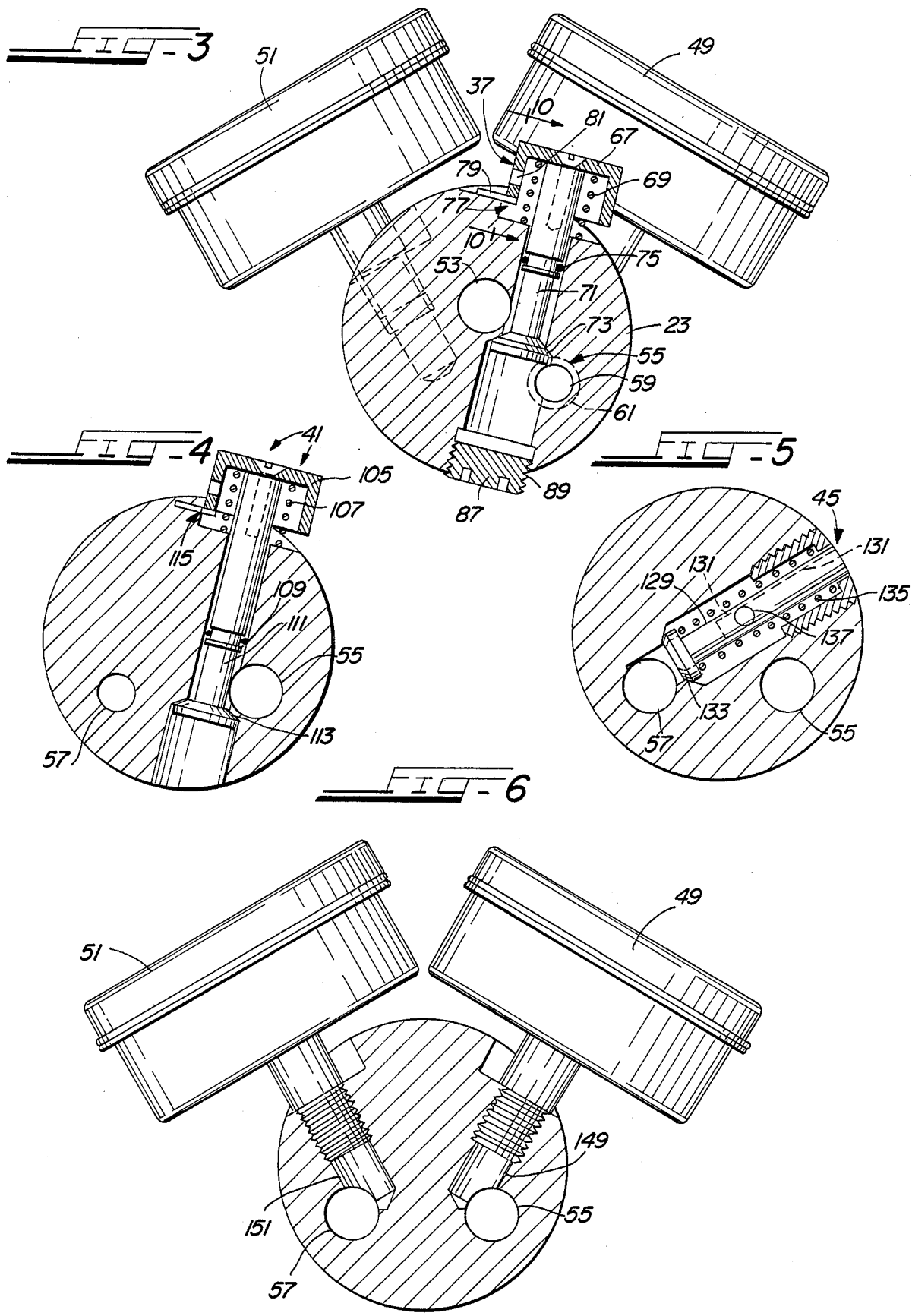

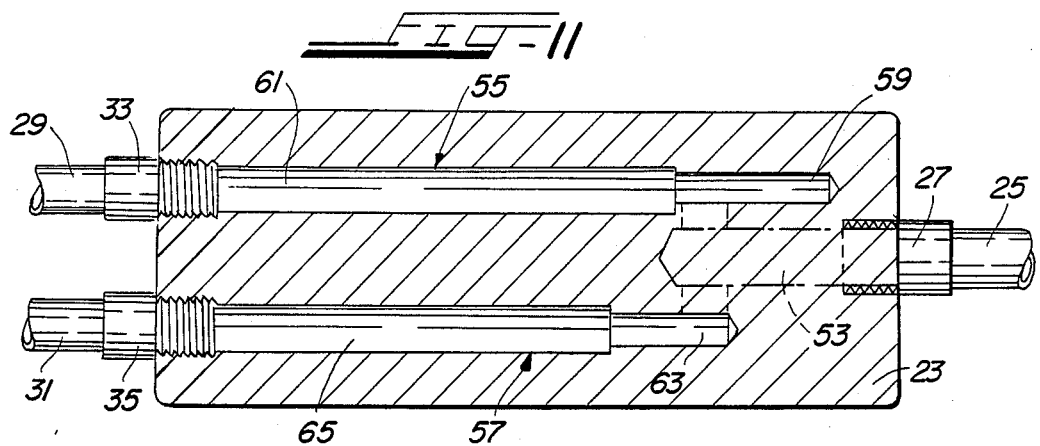
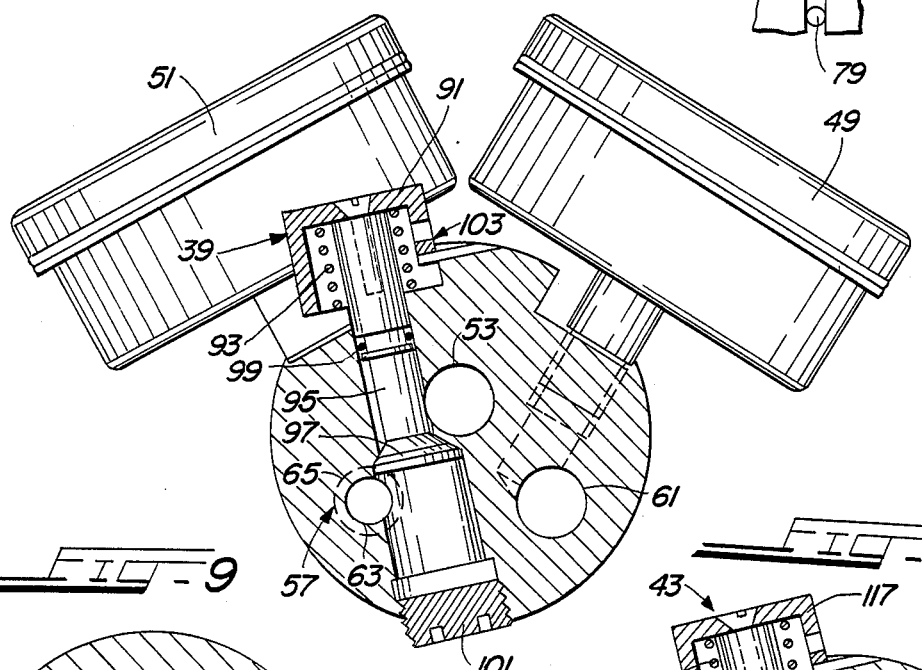
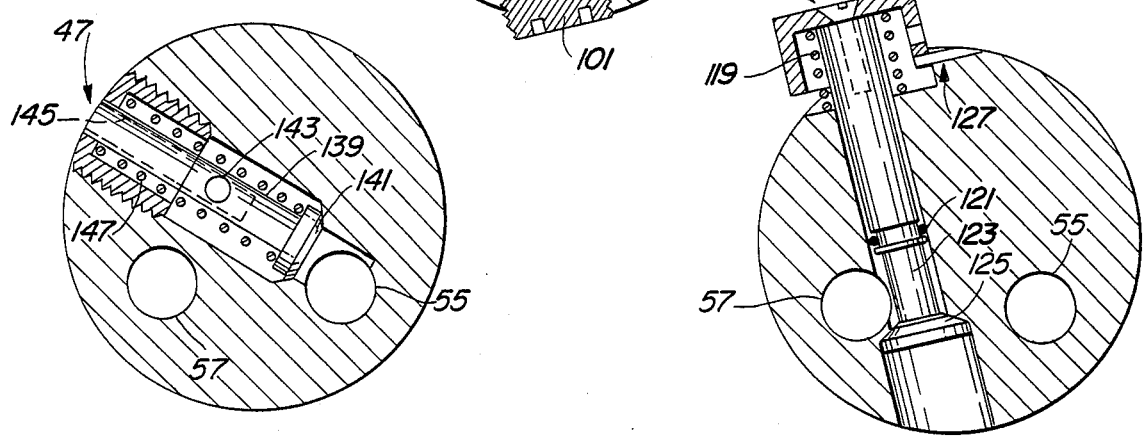

UNITARY MULTIPLE CONTROL VALVE ASSEMBLY

BACKGROUND OF THE INVENTION

1. Field of the Invention

This invention relates generally to a control valve assembly for multiple outlets formed as a unitary structure, and more specifically, this invention relates to a unitary structure having dual valves for controlling the inflation and deflation of inflatable air bags.

2. Description of the Prior Art

High pressure inflatable air bags, such as those shown in the co-pending application of Howard Leibovitz filed on Sept. 13, 1982 for an "External Clamping Device for Inflatable Air Bag", U.S. Pat. Application Ser. No. 06/424,312, have many applications. One very significant application is the use by emergency units to lift or move heavy objects or to break or distort the shape of some item. As just one example, reference may be made to an automobile accident in which the inflatable air bag may be used to lift an automobile or a portion of the automobile off of an injured person; to force open a door or break out a window to permit access to the interior of an automobile; or to bend a portion of an automobile that is entrapping an accident victim.

While not limited to the emergency situation, it is graphically clear that in many emergency situations more than one inflatable air bag may be needed to accomplish the desired purpose. Each of the air bags may be inflated from its own source of compressed air, or one source of compressed air could be utilized to sequentially inflate the air bags. However, in the first of these approaches there is the necessity of having more than one source of compressed air, which adds to the required equipment. In the second approach, the time lost in sequentially inflating the air bags could be very critical in many applications, not just in an emergency situation.

Accordingly, it would be very desirable to be able to simultaneously inflate two or more air bags from a single source of compressed air. At the same time, however, it is also desirable, if not necessary, that the inflation of each of the air bags be separately and independently controllable. Thus, for example, in order to accomplish a desired goal it may be necessary to inflate one of the air bags faster than the other to keep a weight being lifted from shifting improperly, to apply a differential force to achieve a desired bending action, or a variety of other reasons.

In addition to being able to separately and simultaneously control the inflation of two or more air bags, it is also desirable to limit the size of the control mechanism and to make it easily operable by one person. Also, to minimize the possibility of the units becoming separated and misplaced, as well as simplifying the handling, it would be highly desirable to have the multiple controls assembled as a single unitary structure.

Still further, in many applications, again using the emergency situation as an example, there are frequently many tasks that have to be accomplished in a very short period of time. Therefore, if the control has a "positive on" setting, the operator may be tempted to provide assistance in some other area during inflation. If the operator becomes involved in the other task, the air bag could expand to a greater degree than wanted or some problem could develop with the inflating process that could threaten the success of the endeavor. Accordingly, it would also be very helpful to ensure that the inflating, or deflating, process is discontinued if the operator is not actively proceeding.

SUMMARY OF THE INVENTION

In the present invention control valves for a plurality of fluid receptacles, such as inflatable air bags, are formed into a unitary assembly. A single fluid source, such as a source of compressed air, provides the fluid or compressed air for the multiple receptacles or air bags.

The unitary control valve assembly employs a manifold, which may be provided by a solid body member. An appropriate fluid source conduit is located in the manifold, such as by forming a channel in the solid body member. Similarly, at least two oulet conduits are provided in the manifold. Again, these conduits may be provided by forming appropriate channels in the solid member.

A plurality of independently actuatable source valves may be utilized to interconnect the fluid source conduit and the multiple fluid outlet conduits. Similarly, each of the fluid outlet conduits is provided with an independently actuatable discharge valve to permit the fluid in the receptacles to be removed or discharged. In the case of the specific embodiment of inflatable air bags, these discharge valves would control deflation of the air bags.

In a preferred embodiment, actuation of the source valves and the discharge valves may be manually accomplished by the use of push button valves. These push button valves have the advantage that the operator must continuously actuate the push button or it will automatically close, although a locking mechanism is provided in the event that a particular application calls for such an approach. This locking mechanism includes a pin that projects from the body of the manifold and a mating generally L-shaped slot formed in the corresponding push button. The pin rides in the vertical leg of the slot and prevents rotation of the push button, until the push button is fully depressed. At that point, if it is desired to lock the valve open, the push button may be rotated to move the pin into the transverse foot of the slot. In order to maintain the push button in its normal position, unless manually depressed or locked in the open position, a biasing spring is utilized.

Each of the push button valves is provided with a special square section sealing ring that is utilized at the valve seat. These square section sealing rings provide excellent seals against loss of the fluid being controlled. In addition, round O-rings are used on the valve stems to prevent air loss during opening and closing of the valves.

Besides the source valve and the discharge valve, each fluid outlet conduit is also connected to a safety relief valve. The safety relief valves utilize the same square section sealing ring at the valve seat as do the source and discharge valves. A bias spring provides a desired amount of closing force, which may be adjusted, so that if the fluid pressure exceeds a pre-determined desired level the relief valve will be open to discharge at least some of the fluid. It may be noted that the bias spring in the discharge valves is also carefully adjusted to provide a back-up relief valve, in the event that the primary safety relief valve should fail.

In applications such as use with the inflatable air bags, it is also frequently desirable to know the pressure of the fluid in the receptacles. Accordingly, an appropriate gauge may also be connected to each of the fluid outlet conduits.

With the features of the present invention, a unitary control valve assembly is provided for independently controlling fluid flow to a plurality of receptacles from a single source. The single assembly is compact and easily handled, without interfering with the capability of independently controlling the fluid flow to the plurality of receptacles. This is achieved while providing that the control valves must be positively actuated, unless a deliberate choice is made to lock a valve in the open position.

These and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 1 is a side elevational view of a control valve assembly constructed in accordance with the present invention.

FIG. 2 is a cross-sectional view of the control valve assembly of FIG. 1 taken along line 2—2 of FIG. 1.

FIG. 3 is a cross-sectional view taken along line 3—3 of FIG. 1.

FIG. 4 is a cross-sectional view taken along line 4—4 of FIG. 1.

FIG. 5 is a cross-sectional view taken along line 5—5 of FIG. 1.

FIG. 6 is a cross-sectional view taken along line 6—6 of FIG. 1.

FIG. 7 is a cross-sectional view taken along line 7—7 of FIG. 1.

FIG. 8 is a cross-sectional view taken along line 8—8 of FIG. 1.

FIG. 9 is a cross-sectional view taken along line 9—9 of FIG. 1.

FIG. 10 is a partial cross-sectional view taken along line 10—10 of FIG. 3.

FIG. 11 is a cross-sectional view taken along line 11—11 of FIG. 1.

DETAILED DESCRIPTION OF THE PREFERRED EMBODIMENT

A unitary control valve assembly 21 is illustrated in FIG. 1. Control valve assembly 21 has a manifold 23 which, in this preferred embodiment, takes the form of a solid body member. Solid body member of manifold 23 may be formed from aluminum, another metal or a solid plastic.

An inlet line 25 provides a source of fluid, such as compressed air. Inlet line 25 is affixed to manifold 23 by a suitable coupling device 27. A plurality of outlet lines are shown and described in this embodiment in the special context of two outlet lines 29 and 31. Outlet lines 29 and 31 are connected to the other end of manifold 23 by appropriate coupling devices 33 and 35.

For ease of reference, the remainder of this detailed description will relate to the particular embodiment of two outlet lines illustrated herein. However, it should be noted that the invention is not limited to just two such outlet lines, and in some applications it may be desirable to have more than just a dual capacity.

Manifold 23 has mounted thereon independently actuatable source valves 37 and 39. Source valve 37 is associated with outlet line 29, while source valve 39 is associated with outlet line 31. In this preferred embodiment, source valves 37 and 39 take the form of manually actuatable push button valves.

Independently actuatable discharge valves 41 and 43 are also mounted on manifold 23. As in the case of source valves 37 and 39, discharge valves 41 and 43 take the form, in this preferred embodiment, of manually actuatable push button valves. Discharge valve 41 is associated with outlet line 29, while discharge valve 43 is associated with outlet line 31.

Mounted on manifold 23 are also safety relief valves 45 and 47. Safety relief valve 45 is associated with outlet line 31 and safety relief valve 47 is associated with outlet line 29. Safety relief valves 45 and 47 are set to open if the pressure in the associated lines exceeds a predetermined value.

In some instances, it is desirable to be able to ascertain the pressure of the fluid, compressed air in the case of inflatable air bags, in the receptacles, or air bags. Thus, pressure gauges 49 and 51 may be mounted on the manifold 23 in order to provide a reading of the pressure levels. Gauge 49 is associated with outlet line 29, while gauge 51 is associated with outlet line 31.

The fluid connections between inlet line 25 and outlet lines 29 and 31 is best seen in FIG. 11. There it may be seen that the inlet line 25 is connected to a fluid source conduit 53 in manifold 23 by the coupling device 27. In this preferred embodiment, fluid source conduit 53 is formed as a passage or channel in the solid body member of manifold 23.

Outlet line 29 is connected to a fluid outlet conduit 55 by the coupling device 33. Similarly, outlet line 31 is connected to a fluid outlet conduit 57 by the coupling device 35.

As in the case of the fluid source conduit 53, in this preferred embodiment the fluid outlet conduits 55 and 57 are formed as channels or passages in the solid body member of manifold 23. It may be noted that each of the conduits 55 and 57 is formed with a smaller diameter portion and a larger diameter portion. Thus, outlet conduit 55 has a smaller diameter portion 59 and a larger diameter portion 61. Similarly, outlet conduit 57 has a smaller diameter portion 63 and a larger diameter portion 65.

Details of the source valve 37 may be best seen in the cross-sectional view of FIG. 3. From that view, it may be seen that valve 37 has a push button actuator 67 that is urged away from the manifold 23 by a biasing spring 69. Push button 67 is connected to a valve stem 71 that carries a sealing ring 73 to engage the valve seat. Sealing ring 73 is formed with a special square section to increase its sealing capabilities and reduce leakage. To provide sealing during the dynamic steps of opening and closing the valve, a circular section O-ring 75 is located about the valve stem 71.

It may be noted that the fluid source conduit 53 opens into the space above the valve seat, while the smaller diameter portion 59 of fluid outlet conduit 55 is in engagement with the space below the valve seat. Thus, when push button 67 is actuated to move sealing ring 73 from the valve seat, compressed air or whatever fluid is in conduit 53 will pass to conduit 55 and from there to outlet line 29.

If it is desired to hold push button 67 in the depressed condition (i.e., with the valve in the open position), a locking mechanism 77 is provided, as may be better seen in FIG. 10. Locking mechanism 77 is provided by a pin 79 that is secured in manifold 23 and extends into a mating slot 81 formed in push button 67. Push button 79 normally is positioned in a vertical leg 83 of slot 81. In this position, pin 79 prevents the push button 67 from being rotated. However, upon complete depression of push button 67, pin 79 may then be moved into a transverse foot 85 of the L-shaped slot 81, by rotating push button 67. The force of biasing spring 69 will maintain pin 79 in the foot 85 to lock the push button 67 with the valve in the open position.

It should be noted that the space below the valve seat which is in engagement with the fluid outlet conduit 55 is sealed at its lower end by a plug 87. Plug 87 may be secured in position by any appropriate means, such as by threads 89.

Source valve 39 is essentially identical to source valve 37, as may be seen from the cross-sectional view of FIG. 7. Thus source valve 39 has a push button 91 and a biasing spring 93. Valve stem 95 has a square cross-section sealing ring 97 at the valve seat and a circular O-ring 99 about the valve stem 95. Upon depression of push button 91, air or other fluid passes from the source conduit 53 to the reduced cross-section portion 63 of outlet conduit 57. A plug 101 seals the space below the valve seat. A locking mechanism 103, corresponding to locking mechanism 77, is provided for the push button actuator.

Discharge valves 41 and 43 are illustrated in more detail in FIGS. 4 and 8, respectively. As may be seen, these push button valves are substantially the same in structure as the push button source valves 37 and 39. Thus, discharge valve 41 has a push button 105 and a biasing spring 107. A circular O-ring 109 is located about the valve stem 111, and a square section sealing ring 113 is located on the valve stem 111 to engage the valve seat. A locking mechanism 115 is provided to yield the constant open feature.

Outlet conduit 55 is in engagement with the space above the valve seat. Unlike the case with the source valves 37 and 39, in this case the space below the valve seat is not sealed but opens to the atmosphere. Thus, depression of the push button 105 connects the outlet conduit 55 to the atmosphere to provide discharge of the fluid in outlet line 29 and its associated receptacle, such as deflating an inflated air bag.

As in the case of discharge valve 41, discharge valve 43 has a push button 117, a biasing spring 119, an O-ring 121 on valve stem 123, a square section sealing ring 125 and a locking mechanism 127. In this case the discharge to atmosphere occurs through the outlet conduit 57.

Safety relief valves 45 and 47 are shown in greater detail in FIGS. 5 and 9, respectively. Thus, from FIG. 5 it may be seen that relief valve 45 has a central cylindrical member 129 that has a central opening 131 formed along a substantial portion of its length. Cylinder 129, which acts as a valve stem, has a square section sealing ring 135 mounted thereon to engage the valve seat. A biasing spring 135 keeps the sealing ring 133 in engagement with the valve seat. The force of this engagement is pre-set so that the biasing force of the spring 135 will be overcome when the pressure in outlet conduit 57 exceeds a specified level. For example, in the particular embodiment of inflatable air bags, a pressure that has been utilized is 118 psi. The biasing force of spring 35 is adjustable to provide any desired force setting.

Incidentally, it should be noted that the bias springs 107 and 119 of the discharge valves 41 and 43, respectively, are also set to provide a back-up relief function if the primary relief valves 45 and 47 should fail. Thus, in the particular embodiment being described herein, the discharge valves 41 and 43 may be set to open when a pressure of 140 psi is exceeded in one or both of the outlet conduits 55 and 57.

Referring back to FIG. 5, when the predetermined pressure in outlet conduit 57 is exceeded, sealing ring 133 will be separated from the valve seat and the air or other fluid will pass to the interior 131 of valve stem 129 through the opening 137. From there, the fluid is relieved to the atmosphere. In the same fashion, safety relief valve 47 has a valve stem 139 bearing a square section sealing ring 141, having an opening 143 to an interior portion 145 and a biasing spring 147. In this case, when the pressure in outlet conduit 55 exceeds the predetermined value, the fluid will be discharged to the atmosphere.

FIG. 6 illustrates the positioning in connection of pressure gauges 49 and 51 to the respective outlet conduits 55 and 57. As may be seen, pressure gauge 49 has an associated passage 149 that intersects outlet conduit 55, while pressure gauge 51 has a passage 151 that intersects outlet conduit 57.

In order to show the complete flow path for the outlet conduit 55, the cross-sectional view of FIG. 2 has been slightly distorted, particularly with respect to the safety relief valve 47. However, it is believed that this slightly distorted view is justified in order to clarify the operation of the assembly.

It should be understood that various modifications, changes and variations may be made in the arrangement, operation and details of construction of the elements disclosed herein without departing from the spirit and scope of this invention.

We claim:

1. A unitary dual control valve assembly providing for independent control of compressed air flow to a pair of inflatable air bags from a source of compressed air comprising:
   a solid manifold;
   a source channel formed in said solid manifold to convey compressed air from the source;
   a pair of outlet channels formed in said manifold to selectively convey compressed air from the source to the inflatable air bags;
   a first manually actuatable push button source valve to selectively connect said source channel to a first one of said outlet channels;
   a second manually actuatable push button source valve to selectively connect said source channel to a second one of said outlet channels;
   a first manually actuatable push button discharge valve connected to said first outlet channel to permit compressed air in the associated inflatable air bag to be discharged;
   a second manually actuatable push button discharge valve connected to said second outlet channel to permit compressed air and the associated inflatable air bag to be discharged;
   a first safety relief valve connected to said first outlet channel, said first discharge valve constructed to serve as a back-up relief valve if said first safety relief valve should fail;
   a second safety relief valve connected to said second outlet channel, said second discharge valve constructed to serve as a back-up relief valve if said second safety relief valve should fail;
   a first pressure gauge connected to said first outlet channel; and a second pressure gauge connected to said second outlet channel.

2. A dual control valve assembly as claimed in claim 1 and further comprising a locking mechanism associated with the push button of each of said push button valves to permit the corresponding valve to be locked in its open position.

3. A dual control valve assembly as claimed in claim 2 wherein each of said locking mechanisms comprises:
   a pin secured in and extending from said manifold; and
   a generally L-shaped slot formed in the push button of said push button valve, said pin normally located in the leg of said L-shaped slot, said push button being rotatable when depressed to move said pin into the foot of said O-shaped slot and achieve the desired locking effect.

4. A dual control valve assembly as claimed in claim 3 wherein each of said source valves, each of said discharge valves and each of said relief valves employs a square section seal at the valve seat.

5. A dual control valve assembly as claimed in claim 4 and further comprising an O-ring seal about the stem of each of said source valves and each of said discharge valves.

* * * * *